Patented Jan. 17, 1939

2,143,880

UNITED STATES PATENT OFFICE 2,143,880

COMPOSITION OF MATTER AND METHODS AND STEPS OF MAKING AND USING THE SAME

William A. Hughes, Morristown, N. J., assignor to The Harvel Corporation, a corporation of New Jersey No Drawing. Application May 16, 1935, Serial No. 21,808

8 Claims. (Cl. 260—8)

The present invention relates generally to products obtained by bringing together radicles selected from those which are characteristic of cashew nut shell liquid and of marking nut shell liquid and the characteristic radicles of condensation products of the glycerine-phthalic anhydride type, and the present invention also relates to methods and steps for bringing said radicles together to get the desired results.

Generally, the characteristic radicles of condensation products of the glycerine-phthalic anhydride type are those of polyhydric alcohols and those of polybasic acids and are supplied either by the alcohols or acids or acid anhydrides themselves or by condensation products of alcohols with the acids or anhydrides. Also, in the methods of the present invention, the said radicles can be supplied both by the materials thereof themselves and by condensation products containing such radicles. The radicles exemplifying polyhydric alcohol and polybasic acids and anhydrides are respectively those of glycerol and phthalic acid or phthalic anhydride as shown by Watson Smith in 1901 and by other compounds used in this highly developed art both before and after Smith.

Hereinafter, for simplification and convenience, the term "alkyd" will be used to indicate condensation products of the polyhydric alcohol-polybasic acid type.

Examples of radicles found in cashew nut shell liquid and useful in the practice of the present invention are those of anacardic acid, $C_{22}H_{32}O_3$ and cardol, $C_{32}H_{52}O_4$, and an example of a radicle obtainable therefrom is that of cardanol, $C_{14}H_{27}C_6H_4OH$ (1, 3), which is obtainable by destructive distillation of cashew nut shell liquid or of anacardic acid. Examples of radicles found in marking nut shell liquid are those of anacardol, $C_{18}H_{30}O$; an acid, $C_{17}H_{16}O_5$; and an acid $C_{15}H_{14}O_5$; and examples of radicles obtainable from making nut shell liquid are those left after breaking off the carboxylic acid radicles of $C_{17}H_{16}O_5$ and $C_{15}H_{14}O_5$ and also radicles of derivatives similar to those derivatives of cashew nut shell liquid set forth below.

Illustrative examples of derivatives of cashew nut shell liquid and marking nut shell liquid whose characteristic radicles are useful for combination with polyhydric alcohol and polybasic acid and anhydride radicles are hydrogenated cardanol, $C_{14}H_{29}C_6H_4OH$, cardanol esters, e. g., benzoyl cardanol, cardanoxyacetic acid, acetates of cashew nut shell liquid, acetate of cardanol ethers such as ethyl ether of cardanol, $C_{14}H_{27}C_6H_4OC_2H_5$, tertiary butyl cardanol ether, $C_{14}H_{19}C_6H_4OC_4H_9$, and the corresponding derivatives of cardol, anacardol, and the two acids identified above as obtainable from marking nut shell liquid. These are merely illustrative examples of materials suitable for supplying the radicles characteristic to cashew nut shell liquid and marking nut shell liquid and to materials obtainable therefrom and to derivatives thereof and it is purposed that these examples shall not limit the claims hereof because other materials will serve the purpose and scope of the present invention. These radicles as such in chemical reactions can combine with others at a point on the benzene nucleus, at an unsaturated linkage in the aliphatic side chain, at the hydroxyl oxygen or at any other point.

In the claims hereof the phrase "materials having radicles characteristic of cashew nut shell liquid" or similar phrase is intended to cover cashew nut shell liquid itself; polymerized cashew nut shell liquid; heat treated cashew nut shell liquid; hydrogenated cashew nut shell liquid; oxidized cashew nut shell liquid; the natural constituents of cashew nut shell liquid, anacardic acid and cardol; and derivatives thereof such as cardanol, polymerized cardanol and hydrogenated cardanol, and other hydrogenated cashew nut shell liquid products; esters, acid esters and ethers of cashew nut shell liquid; formaldehyde reaction products of cashew nut shell liquid, of cardanol and of the derivatives of cashew nut shell liquid and cardanol such for example as ethers and esters; and other compounds and materials derived from cashew nut shell liquid and having desirable characteristics due to their origin. Likewise similar phrases relate to marking nut shell liquid and materials derived therefrom.

As examples, the polyhydric alcohol-polybasic acid or alkyd resins used in the compositions of the present invention can be of any kind of this type of resin whether the simple resin is used or some derivative thereof such for general illustrative examples as those in which a part of the polybasic acid is replaced by some other acid such as a monobasic acid, those in which acid components of vegetable oils are used, or those in which a phenol or a phenolaldehyde resinous condensation product is used. For example, the alkyd resin can be one which has been made by heating together two molecular weights of glycerine and three molecular weights of phthalic anhydride in a manner now well known in the art. Among others, the United States Letters Patents of Michael J. Callahan, Arsem, Dawson, Adams, and Kienle are referred to as illustrative disclosures of polyhydric alcohol-polybasic acid reaction materials suitable for use with cashew nut shell liquid and marking nut shell liquid and related products in the practice of the present invention.

As illustrative examples of alkyd resins suitable for use in the practice of the present invention reference is hereby made to the general and particular examples given in U. S. Patents #1,893,873 to Kienle and #1,893,874 to Adams and also to Examples I and II below. These are not limiting because other alkyd condensations are suitable.

*Example I.*—Two parts by weight of phthalic anhydride and one part of glycerine are mixed together and heated slowly to about 185° C. at which point the temperature is kept constant until distillation stops when the condensation product is in a syrupy state and can be used in the practice of the present invention. However, to get a resinous product, the heating can be continued, during which the temperature can be kept anywhere between 185° C. and 210° C. until small samples on cooling become hard and brittle without stickiness.

*Example II.*—One molecular proportion of glycerol and one molecular proportion of phthalic anhydride are heated to 200–210° C. until evolution of gas decreases, when one-quarter of a molecular proportion of phthalic anhydride and one-half of a molecular proportion of oleic acid are added. At first two layers are formed but after heating to 200–215° C. reaction occurs and the temperature if continued should be at about 220° to 230° C., the product ranging from the syrupy state to an infusible state depending on the time and temperature of heating.

*Formula A.*—An example of a method of the present invention is to thicken or polymerize cashew nut shell liquid by heating with about two to five per cent of its volume of sulphuric acid, zinch chloride, aluminum chloride, phosphorus oxychloride or other acid dehydrating agent to a rubber-like condition or to a condition between the original condition of the cashew nut shell liquid and the rubber-like condition and then mix the thickened product with a polyhydric alcohol-polybasic acid condensation product, for example, any of the condensation products of Examples I and II above, or any product from either of the Kienle or Adams patents numbered above, the particular product from the syrupy to the hard resin state being selected according to the use to which the final product is to be put and to the conditions under which it is further condensed, if that is necessary. The rubber-like product and the said condensation product can be mixed and worked in together on rubber-mixing rolls. Also, according to a variation of this method, I dissolve a resin of the polyhydric alcohol-polybasic acid type or alkyd type, such as any of those above given as examples, in cashew nut shell liquid and then polymerize the cashew nut shell liquid of the mixture with a reagent such as sulphuric acid, zinc chloride or other acid dehydrating material as set forth above, in amount equivalent to about two to five per cent by volume of the cashew nut shell liquid in concentrated sulphuric acid. The products in the examples of both of these variations are suitable for sheeting out or for molding or for use in other manners, for use alone or for mixing with rubber and with various other materials. In both these latter cases it appears that the alkyd resin is dissolved in the polymerized cashew nut shell liquid. Whether any reaction takes place between the polymerized cashew nut shell liquid and the said resin is not known.

There is now given an example in which a polyhydric alcohol-polybasic acid condensation product is reacted with cashew nut shell liquid, a phenol and formaldehyde, the following ingredients being used in parts by weights, as follows:

*Formula B*

| | |
|---|---|
| Phthalic acid anhydride | 185 |
| Glycerine | 103 |
| Cashew nut shell liquid | 500 |
| Cresylic acid | 375 |
| HCH2O (38% water soln) | 400 |

The phthalic acid anhydride and glycerine are heated together at about 200 C. to a hard button, after which the other ingredients are mixed therewith, the phthalic acid-glycerine resin being dissolved in the cashew nut shell liquid, and the mixture refluxed to a resinous body, like a varnish base. This resinous body when heated at about 160° C. gives a tough somewhat flexible material. It is soluble in naphtha and solvents and can be used with or without a solvent for coating, impregnating, molding and other uses.

As another example, Formula C, cashew nut shell liquid can be heated to about 600° F. after which driers are added, for example, one-half of one per cent of the weight of cashew nut shell liquid in litharge is stirred in when the temperature gets back down to about 450° F. at which point the temperature is held until a desired body is obtained. To this varnish base the alkyd resin of Example I above is added in amount about thirty per cent by weight of the cashew nut shell liquid used. At about 300° F. a solvent is added in amount to give about forty per cent solids and comprising about one part of high flash naphtha to three parts of petroleum distillate such as a fraction taken between gasoline and kerosene. This formula can be modified in various ways to suit different needs and conditions of use, for example, gilsonite in about an equal amount to the cashew nut shell liquid can be added at the beginning and heated with the cashew nut shell liquid to 600° F. and the succeeding steps observed as above set forth. This formula C can also be modified by adding linseed oil either before or after the heating to 600° F., in amount about equal in quantity to the cashew nut shell liquid, for example, and the amount of driers increased accordingly to double the amount used for the cashew nut shell liquid without the linseed oil.

*Formula D.*—About thirty parts by weight of phthalic anhydride and twenty parts of glycerine were heated at about 200° to 210° C. until evolution of gases abated after which were added about thirty-five parts of cashew nut shell liquid which has been heated up to about 600° C. and cooled. The mixture was heated for about two hours in the range from 200° C. to 240° C. Samples picked up on paper dipped in this left a uniform film which set in air at room temperature and dried in the oven at about 150° C. The temperature of the mixture was raised to about 300° to 320° C. for about one-half hour when a resin was formed which was solid at room temperature.

*Formula E.*—Cardanoxyacetic acid, $$C_{14}H_{27}C_6H_4OCH_2COOH$$

can be substituted in molecular proportion for part or all of the oleic acid in Example II to get a resinous product which can be cut with a solvent and used as a varnish or impregnating material or used as a hard resin.

Having thus described my invention, what I claim and desire to protect by Letters Patent is:

1. The method which comprises heating together a phthalic anhydride-glycerol condensation product and cashew nut shell liquid.

2. The method which comprises heating together a phenolic material derived from a liquid from the shell of a nut of a member of the anacardium genus of the anacardiaceae family, phthalic acid and glycerol, said phenolic material being characterized by the fact that it has on the nucleus thereof an unsaturated hydrocarbon radicle characteristic of the liquid from which it is derived.

3. The method which comprises heating cashew-nut shell liquid to dissociate carbon and oxygen from the anacardic acid constituent thereof while leaving the characteristic unsaturated side chain on the nucleus and heating the resulting product with phthalic acid and glycerol.

4. A heat reaction product of cashew nut shell liquid, phthalic acid and glycerol.

5. A liquid coating material comprising the heat reaction product of glycerol, phthalic acid, anacardic acid, and a fatty oil.

6. A heat reaction product of glycerol, phthalic acid, drying oil fatty acid, and a phenolic constituent of cashew nut shell liquid.

7. A heat reaction product of glycerol, phthalic acid, a phenolic constituent of cashew nut shell liquid, and an aldehyde.

8. A heat reaction product of phthalic anhydride, glycerol, and thickened cashew nut shell liquid.

WILLIAM A. HUGHES.